Jan. 28, 1969 R. D. LICHTI 3,424,321
STABILIZING AND DRIVE MEANS FOR A PARKING APPARATUS
Filed July 14, 1965 Sheet 5 of 6
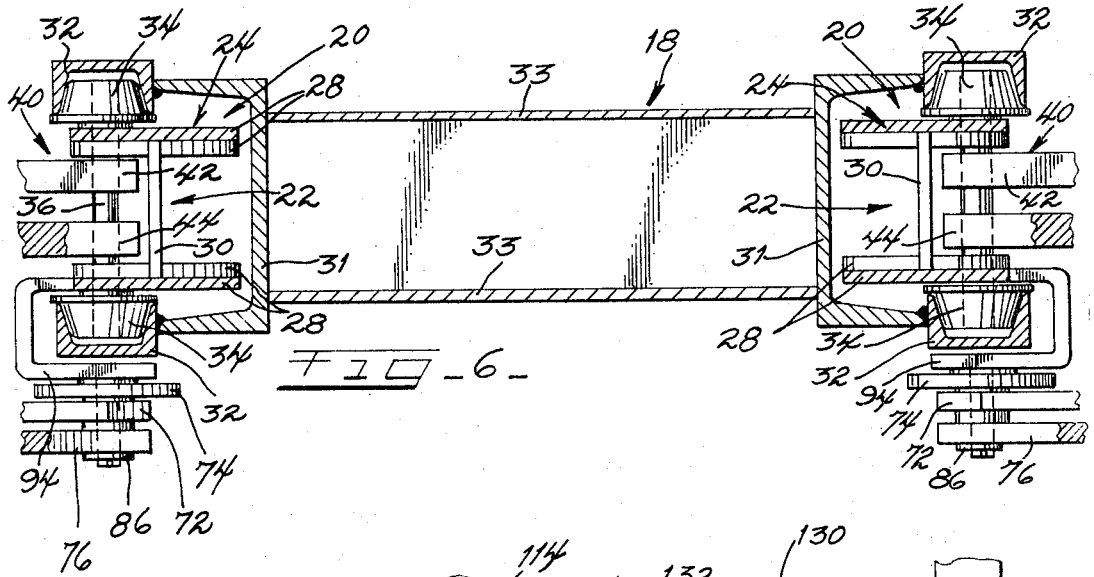
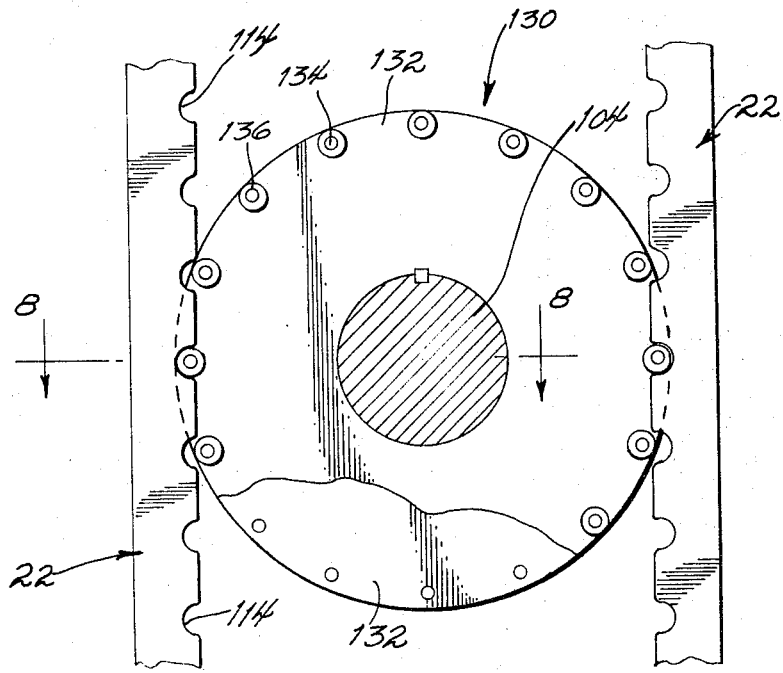
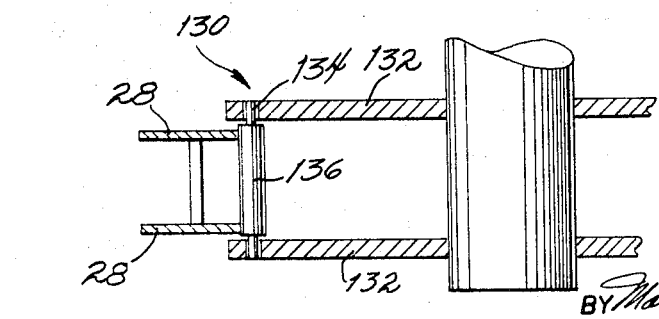
INVENTOR
ROBERT D. LICHTI
ATT'YS.

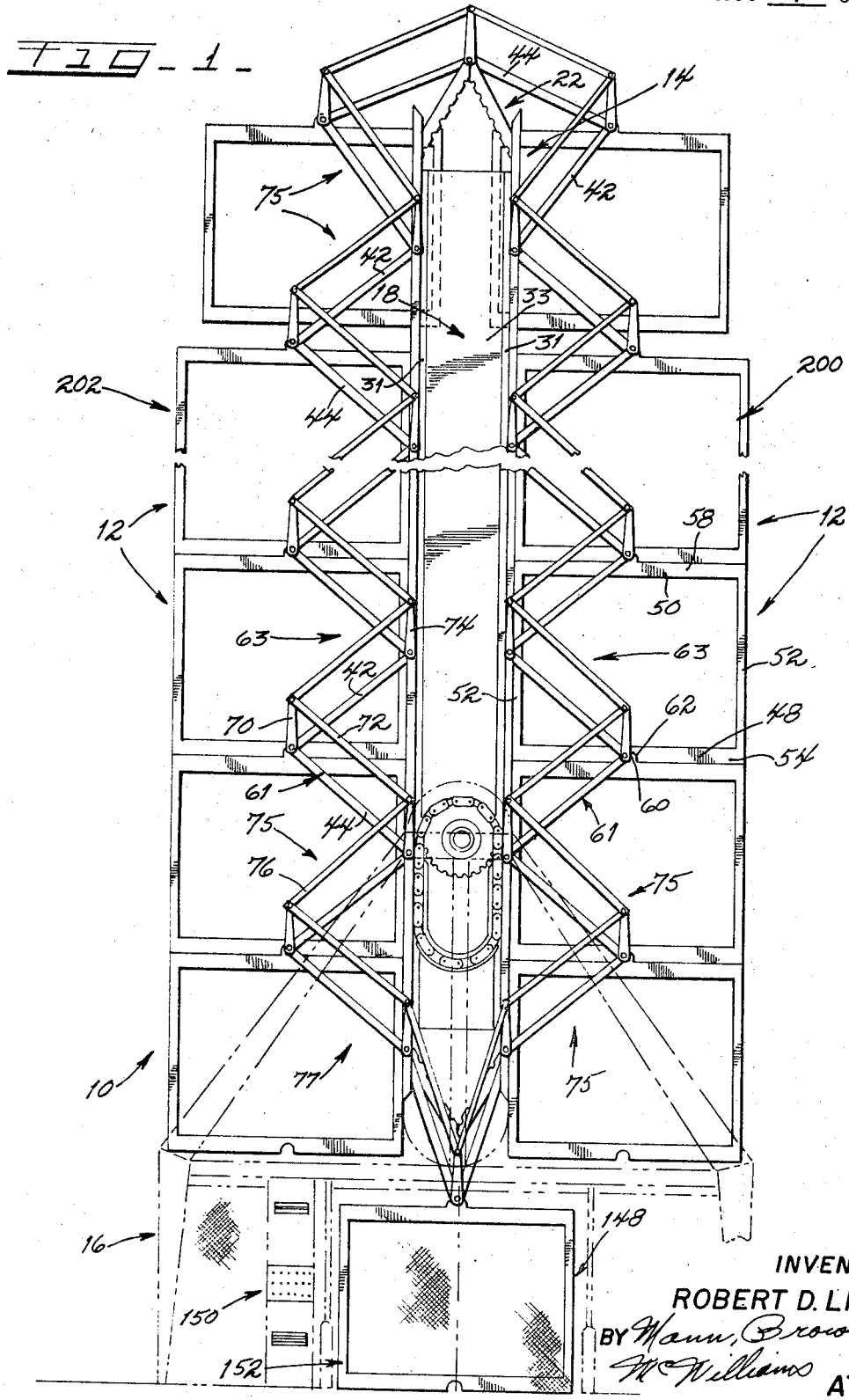

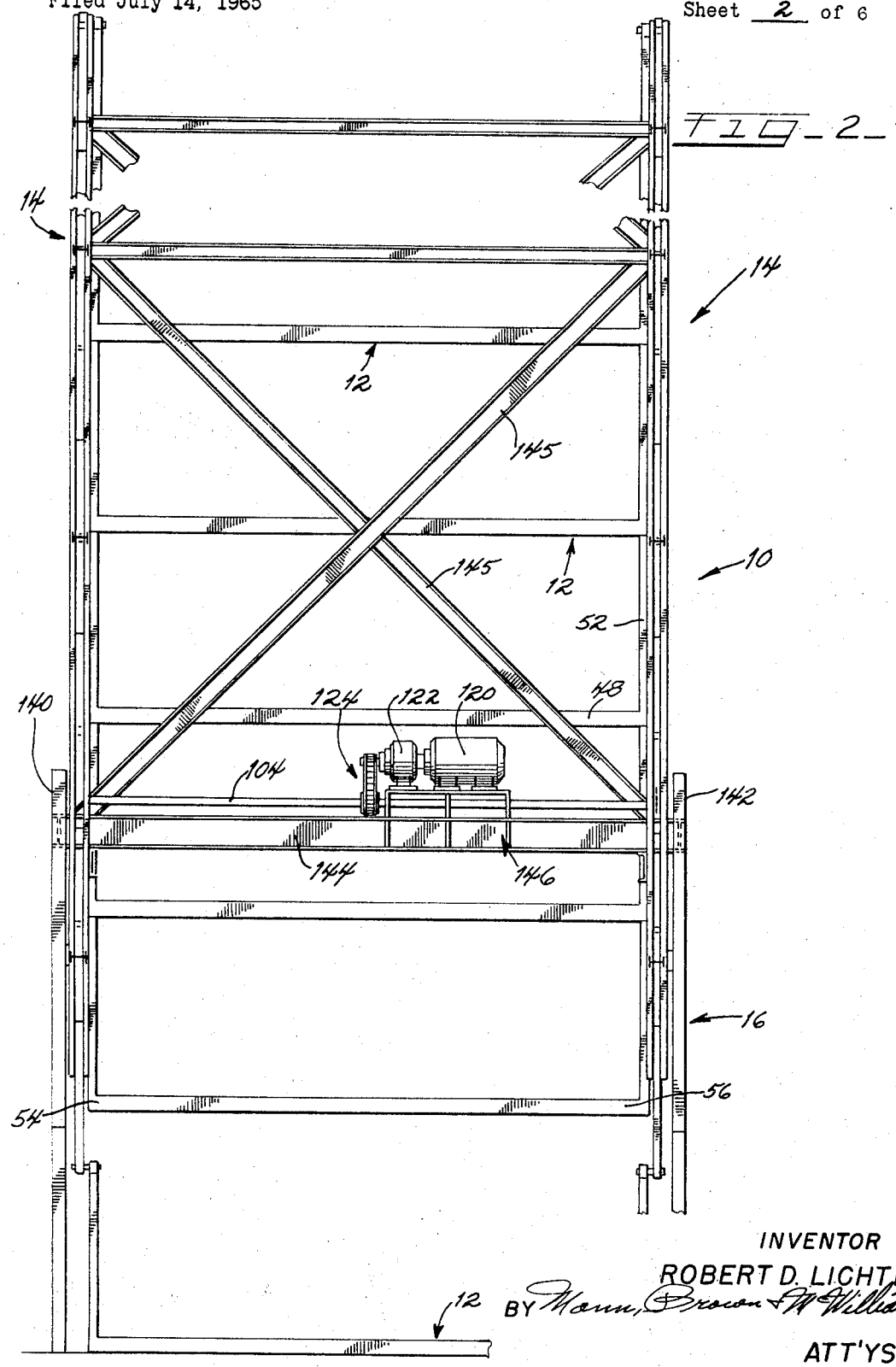

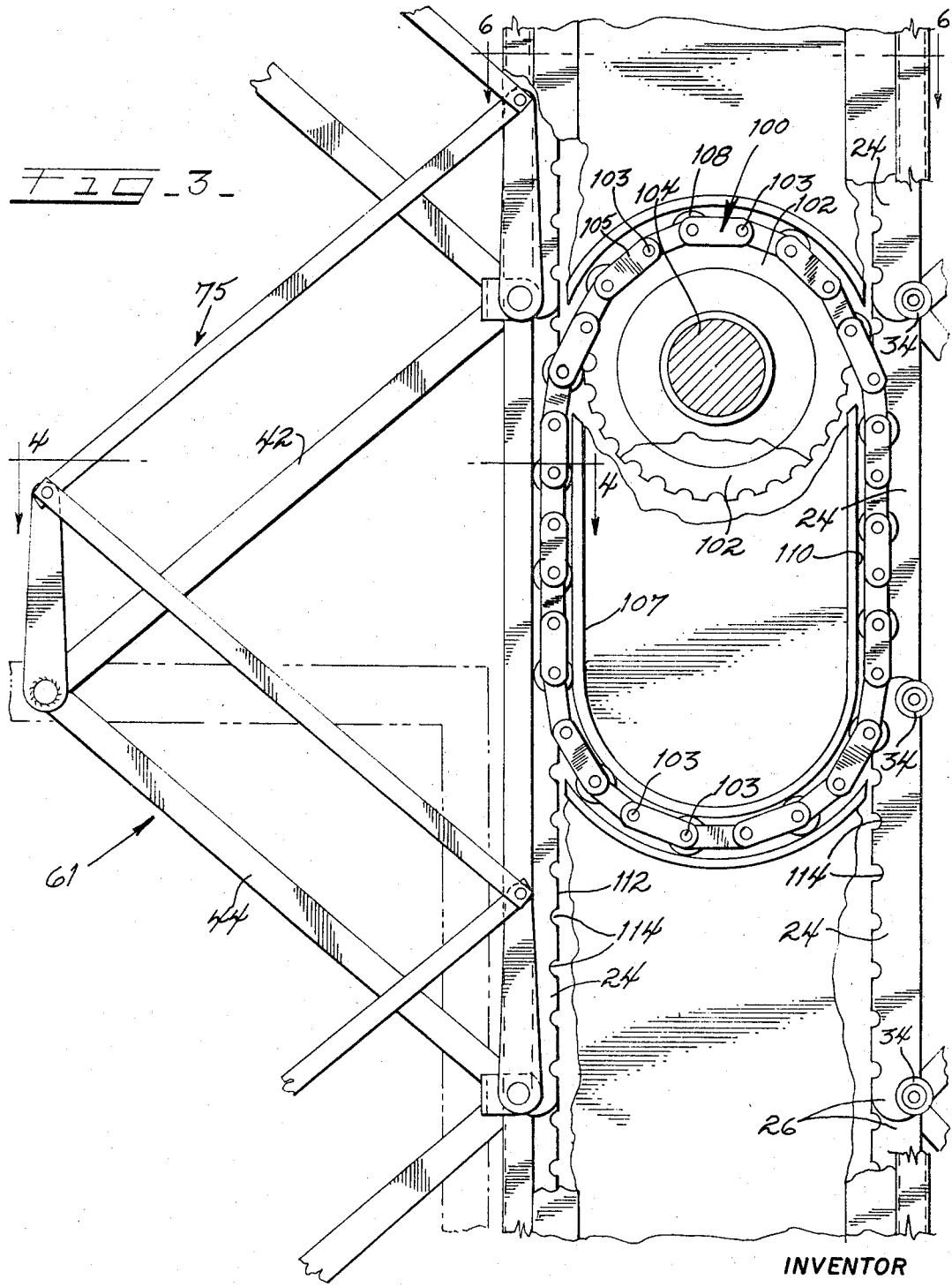

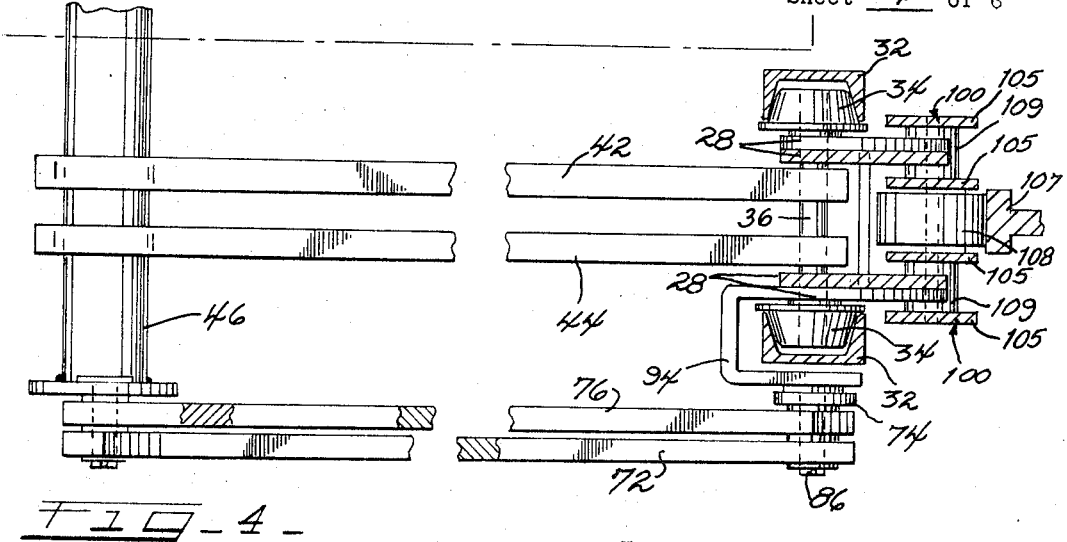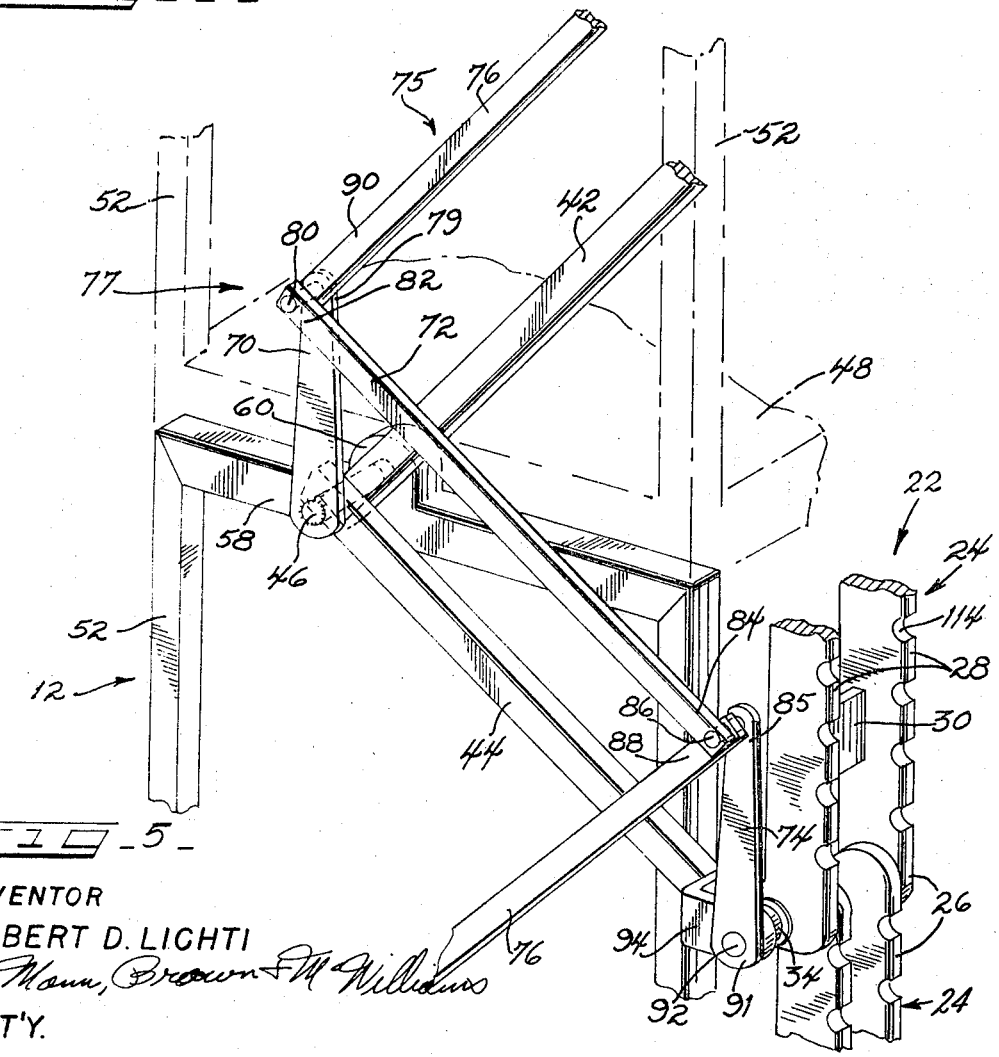

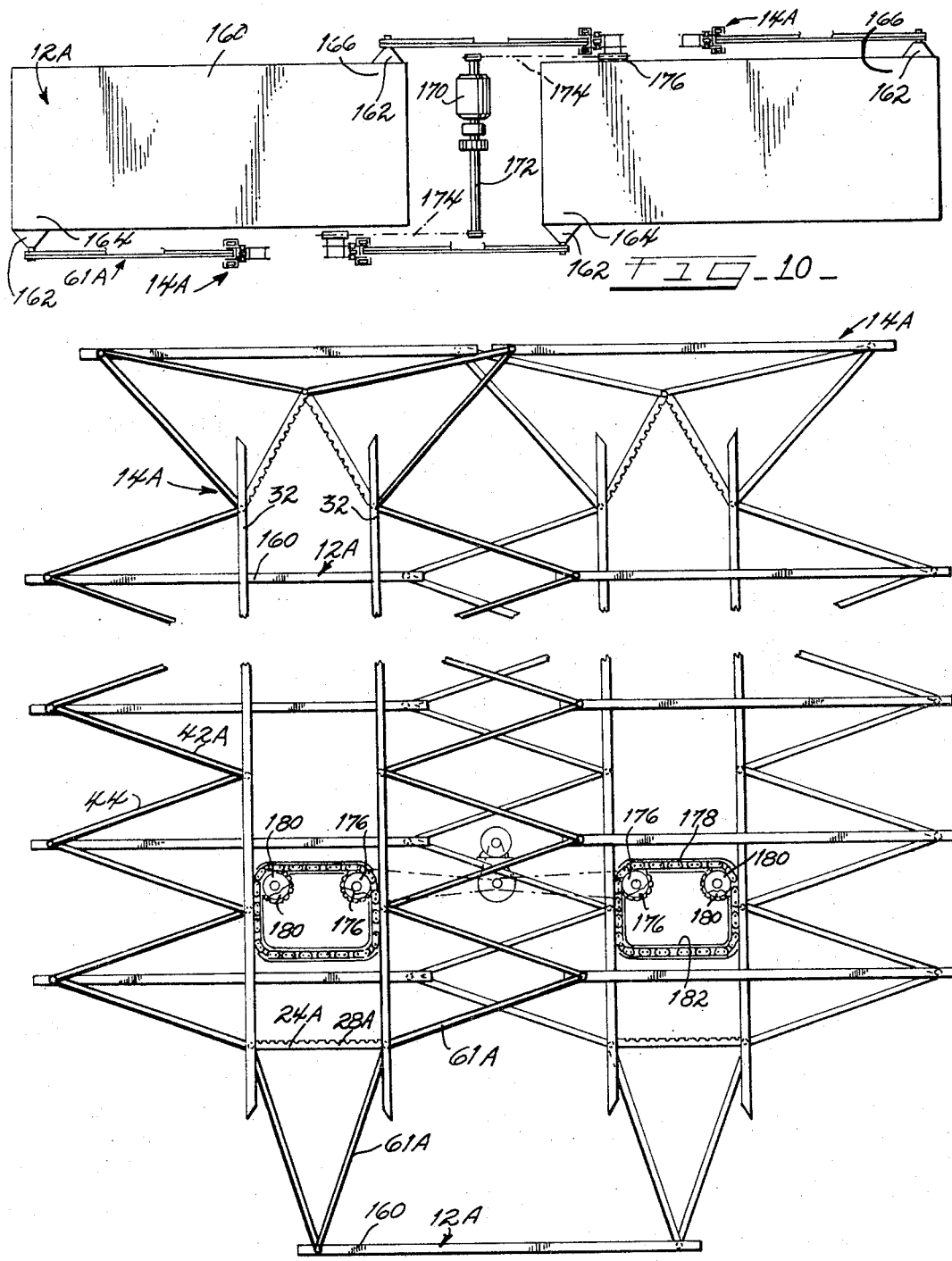

United States Patent Office 3,424,321
Patented Jan. 28, 1969

3,424,321
STABILIZING AND DRIVE MEANS FOR A
PARKING APPARATUS
Robert D. Lichti, Long Beach, Calif., assignor of twenty-three percent each to Walter A. Webster, Albuquerque, N. Mex., Harold G. Goble, Denver, Colo., and Robert F. Campbell, Placentia, Calif.
Filed July 14, 1965, Ser. No. 471,997
U.S. Cl. 214—16.1        5 Claims
Int. Cl. E04h 6/12; B65g 17/12, 17/32

ABSTRACT OF THE DISCLOSURE

The invention relates to a vehicle parking arrangement for automobiles and the like in which vehicle support platforms are suspended in endless conveyor fashion between a pair of vertically disposed endless conveyors. The platforms are supported from the respective conveyor links, with conveyors themselves having no end pulleys but rather being supported through a motion transmitting connection adjacent to but above the lower ends of the respective guideways of the respective conveyor. The motion of the respective platforms is controlled by a motion stabilizing parallel linkage assembly which for each platform includes a link that is made fast with respect to the platform and has its configuration controlled to hold the platform against sway.

---

My invention relates to a vehicle parking arrangement, and more particularly, to a vehicle parking arrangement that is adapted to provide capsulized vehicle storage units of uniform size and operating characteristics to supply the present-insatiable demand for parking facilities.

Conventional vehicle parking arrangements call for the construction of large buildings and complex handling equipment to enable an installation to handle as many vehicles, such as autos, as might possibly be stored in the area utilized. Examples are the multi-story buildings found in urban centers, and it is obvious that such structures require a tremendous capital investment as well as a large work force to operate and maintain them.

In spite of the number and size of such vehicle accommodations, the vehicle parking situation in urban centers remains critical. It is well-known that any business nowadays must give consideration to parking facilities in making plans to insure the maximum freedom of customer and/or employee access to the place of business, and few businesses can afford the conventional multi-story parking facilities to solve this problem.

A principal object of my invention is to provide a simplified capsulized vehicle parking arrangement that holds a maximum number of vehicles for the space occupied, and yet is within the means of most business establishments.

Another principal object of the invention is to provide a vehicle parking arrangement that is adaptable to mass production and pre-fabrication techniques for providing modern capacity installations on a mass basis.

Yet another principal object of the invention is to provide a tower type vehicle parking arrangement having minimum ground space requirements and providing for complete control over the vertical movements of the vehicles carried thereby.

Still further objects of the invention are to provide a tower type vehicle parking arrangement in which the vehicle support platforms thereof are carried by endless conveyor forming links which act primarily in compression to support the vehicle load, to provide an effective stabilization system for guiding the movements of the vehicle support platforms without having to resort to camming type guide arrangements to hold the platforms against sway, and to provide a vertical parking arrangement that is economical of manufacture, convenient to install and use, and safe and reliable in operation.

Other objects, uses, and advantages will be obvious or become apparent from a consideration of the following detailed description and the application drawings.

In the drawings:

FIGURE 1 is a front elevational view of one embodiment of my invention arranged for side over side movement of the vehicles and showing diagrammatically the conveyor arrangement in which the vehicle support platforms are incorporated and the supporting framework for the system;

FIGURE 2 is a side elevational view of the arrangement shown in FIGURE 1;

FIGURE 3 is an enlarged fragmental view illustrating the manner in which the vertical loads of the conveyor arrangement are supported and one possible manner of driving the conveyor system;

FIGURE 4 is a diagrammatic cross-sectional view substantially along line 4—4 of FIGURE 3, but on an enlarged scale;

FIGURE 5 is a diagrammatic fragmental perspective view illustrating the relation between the vehicle support platforms, and the supporting and stabilizing linkage that incorporates the platforms into the system shown in FIGURE 1;

FIGURE 6 is a diagrammatic cross-sectional view substantially along line 6—6 of FIGURE 3, but on a scale comparable to that of FIGURE 4, and showing a horizontal sectional view of the vertical girders that support the platform conveyor;

FIGURE 7 is a view similar to that of FIGURE 3 but illustrating a modified form of drive arrangement;

FIGURE 8 is a diagrammatic cross-sectional view substantially along line 8—8 of FIGURE 7;

FIGURE 9 is a front elevational view of a modified form of the invention arranged to carry a vehicle load support platform in end over end relation; and FIGURE 10 is a plan view of the arrangement shown in FIGURE 9.

However, it should be understood that the specific drawing illustrations provided are supplied primarily to comply with the requirements of 35 U.S.C. 112, and that the invention may take other embodiments that are intended to be covered by the appended claims.

GENERAL DESCRIPTION

Reference numeral 10 of FIGURES 1 and 2 generally indicates one embodiment of my invention arranged for side over side conveying of vehicles and comprises a plurality of vehicle support platforms, cages or pans 12 supported between and suspended from a pair of conveyor assemblies 14 that are supported in a vertical position by support framework 16.

The conveyor assemblies 14 each comprise an upright girder structure indicated at 18 defining along either edge thereof a pair of vertically disposed guideways 20 (see FIGURE 6) each defining a runway for an endless conveyor run, which guideways have trained therethrough and about the length of the girder structure 18 an endless conveyor 22 which comprises a plurality of elongate rigid links 24 pivotally connected together in end to end relation at their adjacent ends 26.

The links 24 in the form shown each comprise a pair of bars 28 (see FIGURE 5) joined together to form a rigid unit by suitable tie plates 30 welded therebetween.

The guideways 20 of the girders 18 are each formed in part by elongate channel members 32 on either side of the respective guideways which are proportioned to receive rollers 34 that are journalled on the ends of pins 36 which are employed to pivotally secure together ends 26 of links 24.

The channel members 32 of each guideway 20 are fixed in the indicated opposed spaced relation by being fixed as by welding to the respective channel shaped beams 31, with the beams 31 of each conveyor assembly 14 being joined together by web plates 33 to form the respective girder structures 18.

As indicated in FIGURE 6, the guideways 20 define outwardly opening vertically disposed slots 40 along their outwardly facing sides through which extend truss forming arms or struts 42 and 44 that are secured together and to the links 24 in pairs or sets in truss type support member forming relation to support the individual vehicle support platforms 12.

As indicated in FIGURE 6, the arms or struts 42 and 44 are of the respective pairs formed by same received over the pins 36 (alternate pins 36 in the forms of FIGURES 1–8) that connnect together the ends 26 of links 24, and at their other ends, the bars 42 and 44 of the respective pairs are received over the ends of pins 46 (see FIGURES 4 and 5) that are fixedly connected to the respective vehicle support platforms at either side thereof.

The individual vehicle support platforms 12 are shown largely in block diagram form, and they each comprise a cage structure including a floor structure 48 on which the vehicles are parked, and corner posts 52 at each end thereof which are connected together across the forward and rearward ends 54 and 56 of the platforms 12 by frame members 58 that form the tops of the vehicle support platforms 12. As indicated in FIGURE 5, the pins 46 are affixed to lugs 60 of each frame member 58 at the front and rear ends of the vehicle support platforms.

It is to be noted that the conveyor assemblies 14 are the same at the front and rear ends of the vehicle support platforms, and the individual platforms are supported at their forward and rearward ends by truss type support members 61 that are defined by the connected together sets or pairs of links 24 and arms 42 and 44.

Further in accordance with this invention, the floors 48 of the vehicle support platforms at their forward and rearward ends are formed with downwardly opening notches 62 that are proportioned to receive and complement the respective lugs 60; as indicated in FIGURE 1, it is intended that the vehicle support platforms being conveyed along the vertical runs 63 of conveyor assemblies 14 engage each other in stacked relation, it being intended that the lugs 60 of lower platforms 12, in the stacked relation of the vehicle support platforms, are received in the notches 62 of the platforms immediately above.

Operably associated with the links 24, 42 and 44 of each conveyor assembly 14 are stabilizing links or arms 70, 72, 74 and 76, which, as indicated in FIGURES 1, 3 and 5, are arranged to form a plurality of interconnecting parallel linkage stabilization arrangements 75 that run continuously about the respective conveyor assemblies 14 and form a stabilizing assembly or system generally designated 77.

In the illustrated arrangement, the arms 70 are fixed with respect to the vehicle support platforms 12 to which they are attached, and this may be done by making the respective pins 46 fast to the lugs 60 and fixing the arms 70 to pins 46 against pivotal movement with respect thereto. The individual arms 72 are pivotally secured to the projecting ends 79 of arms 70 by pins 80 at their ends 82, while at their other ends 84 they are pivotally secured to the ends 85 of arms 74 by pins 86 which also pivotally secure ends 88 of arms 76 to the arms 74. The other ends 90 of the arms 76 are pivotally mounted on the pins 80 and thus are pivotally secured to the arms 70.

As indicated in FIGURES 4, 5 and 6, the arms 74 are pivotally secured at their ends 91 by pins 92 to suitable U-shaped brackets 94 that are affixed in any suitable manner to links 24 at one of their ends 26. The pins 92 are in axial alignment with pins 36 that pivotally connect together the ends of links 24.

In the form of the invention shown in FIGURES 1–8, each pair of struts 42 and 44 is connected together at their diverging ends by a pair of the links 24 (see FIGURE 3).

As indicated in FIGURE 1, the conveyors 22 do not have the usual endless conveyor upper and lower tail pulleys, and in accordance with this invention, the conveyors 22 are supported against gravity adjacent the lower ends of the respective assemblies 14 by coupling means that accommodates the motion that links 24 must make relative to guideways 20 to provide for the conveying movement of platforms or pans 12 that is contemplated by this invention.

One way of doing this is specifically shown in FIGURE 3 wherein between the vertical runs 63 of each conveyor 22 a pair of sprocket members 102 are keyed to drive shaft 104 in coplanar relation with respective bars 28 making up the respective links 24, over which sprockets 102 are trained chains 100 that are connected together axially of the shaft 104 by pins 103 that articulate the chain links 105. The chains 100 are also trained over a guide shoe bar 107 and are provided with rollers 108 that ride in guiding relation on the outer surface 110 of the shoe, and rollers 109 that engage bars 28 (see FIGURE 4).

As indicated in FIGURES 3 and 5, the bars 28 are formed along their inwardly directed edges 112 with a plurality of notches 114 in which the rollers 109 seat. Pins 103 of the chains 100 journal both rollers 108 and 109, and are spaced to complement the respective notches 114; rollers 109 are proportioned to complement and fit into the respective notches 114. It will thus be seen that the vertical runs of conveyors 22 rest on the pins 103 which are in turn interconnected through the chains 100 that are supported by sprockets 102 that are in turn supported by the shaft 104, and that the rollers 109 and notches 114 form interengaging means for resting the weight of the conveyors 22 and the loads they support on shaft 104.

The shaft 104 may be driven in either direction by a suitable motor 120 operating through appropriate gear reducer 122 and chain drive coupling system 124 that couples the motor 120 to shaft 104.

The webs of beams 31 and the web plates 33 of girder structures 18 are interrupted in the area of drive chains 100 and guide bar 107 is fixed in place in any suitable manner.

Alternately, the sprocket and chain drive arrangement of FIGURE 3 may be replaced by the disc driving wheel arrangement 130 shown in FIGURES 7 and 8, which comprises a pair of discs 132 keyed to shaft 104 in any suitable manner and joined by pins 134 on which are journalled rollers 136 that are proportioned and spaced to engage within the notches 114 of the bars 28. As indicated in FIGURES 7 and 8, one roller 136 is always in supporting engagement with the bars 28 of either vertical run of the conveyor 22.

The supporting framework 16 may be of any suitable type, and in FIGURE 2 it is shown to comprise a front frame 140 and a rear frame 142 suitably strengthened and reinforced and joined together between the tops of the frames 140 and 142, as by a suitable support beam 144 suitably affixed between the lower ends of girders 18 with girders 18 in turn being suitably affixed to the upper ends of frames 140 and 142, respectively. Shaft 104 is journalled in any appropriate manner at its ends on beam 144. Motor and gear reducer 120 and 122 are mounted in any suitable manner on an appropriate frame 146 that is in turn mounted on the beam 144.

Girder structures 18 are preferably interconnected by suitable brace beams 145 fixed between their opposing webs 33. The lowermost beams 145 may have their ends made fast to beam 144 on either side of shaft 104.

The front frame 140 is provided with an appropriate entrance gate structure where indicated in dashed lines at 148 in FIGURE 1 which is mounted to move to the right or to the left of FIGURE 1. The support structure 142 is provided with a similar exit gate (not shown).

Preferably all the controls for motor 120 are incorporated in suitable circuiting which includes a control panel board where indicated at 150 in FIGURE 1 on the front frame structure 140 for ready operation, and preferably the panel 150 is of the push button control type that on operation will bring a predetermined vehicle support platform 12 to the lowermost position shown in FIGURE 1.

The vehicle parking apparatus 10 thus defines through its supporting frame structure 16 a driveway 152 through which vehicles move for parking onto the individual platforms 12, and for driving off of them when the platforms 12 are positioned at the lowermost position shown in FIGURE 1. It is to be understood that appropriate rampways will be provided in horizontal alignment with the lowermost position of the vehicle platform floor 48 at the entry and exit sides of the apparatus 10.

In the embodiment of FIGURES 9 and 10, the conveyor assemblies 14A are essentially the same as those shown in the embodiments of FIGURES 1-8 except that they are positioned and connected to the vehicle support platforms to move the platforms in end over end arrangement as distinguished from the side over side arrangement of FIGURES 1-8 and stabilization arrangements 75 have been omitted. In this embodiment of the invention, the truss forming arms or struts 42A and 44A are secured at their ends to links 24A (in truss type supporting member forming relation) that between their connections to the arms 42A and 44A are made up of continuous bars 28A rather than the pairs of pivotally connected links 28 of the embodiment of FIGURES 1-8. The individual sets of connected together links 24A and arms 42A and 44A thus define truss type support members 61A.

Also, the vehicle support platforms 12A merely comprise pallets 160 that are each supported at two of their diagonally opposite corners, as indicated in FIGURE 10. Thus, the conveyor assemblies 14A are positioned with respect to and on either side of the pallets 160 so that the truss forming arms 42A and 44A may be connected to the respective pallet corners at suitable pin structures 162, and as indicated in FIGURE 10, the arms 42A and 44A of one of the conveyor assemblies 14A support one of the corners 164 of the respective pallets while the corresponding arms of the other conveyor assembly 14A support the diagonally opposite corners 166 of the respective pallets.

The modified arrangement of FIGURES 9 and 10 is driven by a suitable motor 170 through shaft 172 that drives a pair of chain drives 174 which operatively engage appropriately journalled drive sprockets 176 that drive supporting chains 178 which are arranged in a manner similar to the arrangement shown in FIGURE 3, but which also include idler sprockets 180. Chains 178 are also trained around guide shoes 182 in a manner similar to that shown in FIGURE 3. Sprockets 176 and 180 hold chains 178 in supporting engagement with links 24A in the manner suggested in FIGURES 3 and 6.

The conveyor assemblies 14A are only diagrammatically illustrated (note that most of the structural features of girders 18 have been omitted except channel members 32 to provide a simplified illustration) but incorporate the essential features of the conveyor assemblies 14 except for the differences noted. Assemblies 14A may be erected and supported in any suitable manner and support the vehicle load in the manner described in connection with the embodiment of FIGURES 1-8, except that the vehicles drive onto and off of the lowermost platform 12A by being moved parallel to the planes of the conveyor assemblies 14 until a selected empty vehicle with respect thereto, as in the embodiment of FIGURES 1-8.

OPERATION

Referring again to the embodiments of FIGURES 1-8, and assuming that it is desired to place a car on an empty vehicle support platform 12, the motor 120 is operated to move the vehicle support platforms 12 about the conveyor assemblies 14 until a selected empty vehicle support platform 12 is positioned in the lowermost position of FIGURE 1. After gate 148 is opened, a vehicle is driven onto the said platform 12, after which the vehicle is appropriately blocked in place, as by setting its brakes, and then the operator leaves the vehicle.

After the operator is clear of the thus loaded vehicle support platform, gate 148 is closed. When it is desired to move the loaded platform 12 away from the vehicle loading position, the motor 120 is operated to rotate shaft 104 in the direction desired to start the vehicle support platforms moving about the conveyor assemblies 14, which lifts the last loaded vehicle support platform 12 upwardly, and assuming that the conveyor assemblies are moving counterclockwise of FIGURE 1, to the right of FIGURE 1. It will be noted that when the lowermost vehicle support platform was positioned in its loading position, it was disposed considerably below the remaining vehicle support platforms, but due to the arcuate movement of support members 61 as the lowermost vehicle support platform swings to the vertical stack 200 of the platforms 12 at the right hand side of FIGURE 1, the newly loaded platform 12 is drawn upwardly and into engagement with the next adjacent platform 12 immediately above it, the lugs 60 of the newly loaded platform 12 seating in the notches 62 of the platform immediately above it, and the bottom of floor 48 engaging the top of the upper frame member of the newly loaded platform 12 at either end of the platform. As movement of the apparatus continues in the indicated direction, the newly loaded vehicle support platform moves upwardly until it is at the top of the stack 200, whereupon the portion of the articulated conveyors 22 adjacent same move over the space between the upper ends of guideways 20 for the descending movement of the respective conveyors 22. The links or arms 42 and 44 that are articulated with the links 24 tend to move about an arc or a circle to separate the then uppermost vehicle support platform from the stack 200 and swing it over into vertical alignment with the other vertical stack 202, and as further movement proceeds, the operating linkage involved rests the then top platform 12 of stack 202 onto the frame members 58 of the next adjacent platform 12 with the lugs 60 of the underneath platform nesting in notches 62 of the floor of the top platform 12. The platforms then in stack 202 descend downwardly until the platform 12 in question nears the position in which the link members 24 to which it is attached start to cross over the open portion between the lower ends of the guideways 20, whereupon the platform 12 separates from the platform immediately above it and swings downwardly to the lowermost position shown in FIGURE 1 wherein the vehicle is positioned for unloading.

Movement of the conveyor assemblies 14 in the opposite direction is the same but in reverse. If it is desired to position any one platform 12 for unloading or loading purposes, the operation of motor 120 is appropriately controlled to position the desired platform 12 in the lowermost position of FIGURE 1.

It will thus be observed that as the conveyors 22 move about guideways 20, the links 24 are vertically disposed lengthwise of the stacks 200 and 202, but as the links 24 pass between guideways, they articulate to the sharply angled position shown in FIGURE 1, which together with the swinging nature of the arms 42 and 44 effects the separating action indicated. As the links 24 move into the guideway ends 20, this articulating action unfolds the links 24 to their rectilinear relation shown in FIGURE 3.

A significant improvement in the drive system of my arrangement is that the conveyor links that support the vehicle support platforms act in compression to support the load, and as indicated, the conveyor formed by the links is itself supported adjacent the lower end of the conveyor. This together with the stacking action of the vehicle support platforms along the vertical runs of the conveyor means that in the event of failure at any point of the system that supports any individual vehicle parking platform, the platform cannot fall as it is being supported from below in the stack of vehicle support platforms as well as the effective columnar support provided by the conveyor links 24, the latter being held in a vertical column by the guideways 20. Only when the vehicle support platform passes below the point from which it is supported from below would the possibility of a vertical fall obtain, and at this distance a potential failure can be readily detected and corrected before damage to an automobile can happen.

It has already been pointed out that the conveyors 22 that are defined by the links 24 do not have or require top or bottom sprockets or pulleys. Since the tops of the conveyors 22 are under substantially no load conditions, and the bottoms of the conveyors 22 support in tension a load not greatly in excess of one vehicle parking platform and its load, the links 24, under the guiding action of channels 32, readily pass from one guideway 20 to another at the top and bottom of the system. In the embodiment of FIGURES 1–8, the spacing between the guideways 20 is less than the distance of the two links 24 that form the base of the individual support members 61, and thus the two members 24 tend to take the angle configuration indicated at the top and bottom of conveyors 22 as shown in FIGURE 1. Support members 61 thus contract and then expand longitudinally of the respective conveyors when passing between guideways 20, which tends to extend and retract the effective length of the support members 61 laterally of the respective conveyors 22. This action is an important factor in effecting the stacking and separating action of adjacent platforms 12 that has been described, and to achieve this it is important that the lengths of links 24, arms 42 and 44, and the heights of platforms 12 be proportioned so that when the platforms 12 are moving along the vertical portions of conveyors, adjacent platforms are in engagement.

In the embodiment of FIGURES 9 and 10, the guideways 20 are selected to have a distance apart the same length as the links 24A, and the support members readily flop out of and into the guideways 22 as the conveyors 14A are operated.

The stabilizing arrangement 75 involving arms 70, 72 and 74 defines with arms or struts 42 and 44 a series of interconnected parallel linkages all the way around the conveyors 14, and the over-all result is that all of the vehicle support platforms are held against sway in any position along the conveyor assemblies 14. The stacking of the vehicle support platforms along the vertical lengths of the conveyor 14 and the interconnection between adjacent stacked platforms provided by the lugs 60 and notches 62 also firmly holds the vehicle support platforms against swaying movement. Thus, in my system, the parallel linkage stabilization system 77 is set to hold the individual platforms horizontally disposed, and the stacking action of the conveyor assemblies 14 along the vertical runs of these conveyors keys the platforms together as a further aid against lateral swinging movement.

The drive arrangements suggested in FIGURES 3 and 7 support the entire conveyor system through the rollers that engage in the notches 114 of links 24. However, as indicated in FIGURES 4 and 8, there are at least two points of support for each vertical conveyor run (note that the links 24 are dual in nature, and both the elements 28 thereof are engaged by the paired drive rollers of the embodiment of FIGURE 4 or the single drive roller of the embodiment of FIGURE 8). The driving rollers involved roll into and out of the notches 114 of the links 24, which eliminates lubrication and friction problems.

Vertical girders 18 define upright supports for conveyors 22 that span the vertical distance of the conveyor assemblies 14 and take all of the lateral loads that would come from wind or seismic forces. The configuration of the girders enables them to readily withstand eccentric loads caused by the presence of more parked cars on one side of the apparatus than on the other.

In a commercial arrangement of the embodiment shown in FIGURES 1–8, the apparatus including frame structure 16 measures 20 by 22 feet at its base forming an area of 444 square feet for each parking structure. This particular arrangement has been arranged to provide 21 vehicle platforms or cages, though obviously a greater or less parking capacity may be provided within reasonably practical engineering limits.

Another advantage of my system is that the rollers of the compression links 24 are under practically negligible loads as the truss relationship defined by the links 24 and their connecting arms or struts 42 or 44 cancel out lateral loads and the compression forces work through the links 24 themselves rather than the rollers 34, which avoids the problem of wear on the rollers 34 and their guiding channels 32 and makes possible to use relatively light dimensions for these components.

Furthermore, the linkage system defined by the conveyors 22 is arranged to facilitate servicing. For instance, there is no need for a serviceman to go to the top of the structure, and each linkage arrangement can be serviced from the bottom as at that position all link elements are disposed outside of the guide system and handy for inspection and repair.

I claim:

1. A vehicle parking arrangement comprising:

a pair of upright spaced apart supports each defining a pair of vertically disposed rectilinear guideways adjacent to each other, said guideways of the respective supports being disposed in a common vertical plane, said supports being positioned to dispose said planes in substantial parallelism, each of said pairs of guideways having an endless conveyor trained therethrough, said conveyors each comprising a plurality of pivotally conected support members projecting laterally of said guideways in the vertical plane of the respective guideways, said support members each comprising a base member and a pair of arm members with said arm members being secured to the respective ends of the respective base members and having their other ends joined together to define a truss structure, and with the base members of adjacent support members at said ends thereof being connected in articulated relation to form the respective conveyors, said joined ends of the respective pairs of arm members forming projecting portions of the respective support members, said guideways being formed to dispose and maintain said base members of the respective support members in substantial vertically aligned relation intermediate the upper and lower ends of the respective guideways, said support members being disposed in horizontally aligned pairs, a vehicle support platform suspended from the projecting portions of the respective pairs of said support members for pivotal movement about a horizontal axis relative to the support members supporting same as said conveyors are moved to consecutively transfer said support member pairs from one guidway to another of the respective upright supports, means for supporting said conveyors of each guideway adjacent but above the lower ends of the respective guideways whereby said conveyors support said vehicle support members in compression above said supporting means, means for driving said conveyors, and stabilizing means operably interconnected between said vehicle support platforms and said cnveyors for maintaining said vehicle support platforms against motion on being moved by said conveyors, said stabilizing means comprising linkage means interconnecting said base members of the respective support members with the vehicle support platform it carries, said linkage means of each support member comprising a first link paralleling one of said arm members thereof, a second link paralleling the other arm member thereof, connecting parallel links between like ends of said first and second links, respectively, and the respective said ends of the support base member, and with the other ends of said links being connected together and to the vehicle support platform by a link that is made fast with respect to the vehicle support platform and is parallel said connecting links, said first, second, and connecting links defining with said support member arm members a parallelogram configuration, and means for controlling said parallelogram configuration defining links to hold the respective platforms against sway.

2. The vehicle parking arrangement set forth in claim 1 wherein:

said parallelogram configuration controlling means comprises said support member arm members and said links being connected together to form a series of interconnected parallel linkages about said conveyors that hold said platforms against sway.

3. A vehicle parking arrangement comprising:

a pair of upright supports mounted and supported in spaced apart relation and each defining a pair of vertically disposed rectilinear guideways adjacent to each other for an endless conveyor run, said guideways of the respective supports being disposed in a common vertical plane, said supports being positioned to dispose said planes in substantial parallelism, each of said pairs of guideways having an endless conveyor trained therethrough to define rectilinear conveyor runs extending through the respective guideways that are connected between adjacent ends of the respective guideways by conveyor connecting portions, said conveyors each comprising a plurality of rigid elongate links pivotally connected together in end to end relation for relative pivotal movement about axes that extend perpendicular to said planes, when the respective links form said conveyor connecting portions, support members carried by each of said conveyors and projecting laterally of the respective guideways in the plane of the respective guideways, said support members each comprising a base member and a pair of arm members with said arm members being secured to the respective ends of the respective base members and having their other ends joined together to define a truss structure, and with the base members of the respective support members comprising at least one of said conveyor links, said joined ends of the respective pairs of arm members forming projecting portions of the respective support members that project outwardly of the respective guideways, said guideways being formed to dispose and maintain those of said links forming said conveyor runs in substantial vertically aligned relation intermediate the upper and lower ends of the respective guideways, said support members of the respective conveyors being equal in number and being disposed to position same in vertically spaced pairs about the lengths of said conveyors, a vehicle support platform suspended from the projecting portions of the respective pairs of said members for pivotal movement about a horizontal axis relative to the support members supporting same as said conveyors are moved to transfer said support members between said conveyor runs of the respective upright supports, means for supporting said conveyors and the weight carried thereby at a location adjacent and above the lower ends of said guideways respectively, whereby the links of said conveyors above said supporting means support said vehicle support platforms in compression, said supporting means comprising conveyor link motion accommodating coupling means for each conveyor positioned at said location to engage the links of the respective conveyor runs that are disposed at said location, said coupling means and said links including interengaging means for resting the weight of said conveyors and their vehicle support platforms on said coupling means, and means for mounting said coupling means to support the loads carried thereby, means for driving said conveyors to selectively move said support platforms in endless conveyor fashion therealong and between said conveyor runs, said conveyor connecting portions being unsupported vertically other than by said conveyor runs, whereby, those of said links froming the respective conveyor connecting portions pass between the respective guideways of the respective supports without requiring end pulleys at the upper and lower ends of said guideways, and stabilizing means operably interconnected between the respective vehicle support platforms and said conveyors for maintaining said vehicle support platforms against swinging motion relative to said guideways on being moved by said conveyors, said stabilizing means for each support platform comprising a first stabilizing link paralleling one of said arm members of said support member, a second stabilizing link paralleling the other arm member thereof, said first and second stabilizing links being connected together at like ends, connecting parallel stabilizing links between the other ends of said first and second links, respectively, and the respective said ends of the support base member thereof, and between said like ends of said first and second stabilizing links and the vehicle support platform, the last mentioned link being made fast with respect to the vehicle support platform, and said first, second and connecting stabilizing links defining with said support member arm members a parallelogram configuration, and means for controlling said parallelogram configuration defining links to hold the respective vehicle support platforms against sway.

4. The vehicle parking arrangement set forth in claim 3 wherein:

said upright supports, said support members, and said platforms are arranged for side over side conveying of said platforms.

5. The vehicle parking arrangement set forth in claim 3 wherein said coupling means for the respective conveyors comprises:
  a motion transmitting device coupled to the respective conveyor runs,
  said mounting means supporting the respective motion transmitting devices,
  and means for synchronously driving said motion transmitting devices and comprising said drive means.

References Cited

UNITED STATES PATENTS

| | | | |
|---|---|---|---|
| 991,549 | 5/1911 | Schuchardt | 214—16.1 |
| 1,639,435 | 8/1927 | Nilsson | 198—138 |
| 1,859,874 | 5/1932 | James | 198—158 |
| 1,906,827 | 5/1933 | Sumi et al. | 214—16.1 |
| 2,089,047 | 8/1937 | Zrna | 214—16.1 |
| 2,619,239 | 11/1952 | Hild et al. | 214—16.1 |
| 2,731,160 | 1/1956 | Maier | 214—16.1 |
| 2,773,609 | 12/1956 | Holappa | 214—16.1 |
| 3,110,393 | 11/1963 | Hurt | 198—158 |
| 3,186,783 | 6/1965 | Graber | 198—158 |
| 3,236,577 | 2/1966 | Anders et al. | 214—16 |

FOREIGN PATENTS

| | | |
|---|---|---|
| 1,230,015 | 3/1960 | France. |
| 841,640 | 6/1952 | Germany. |
| 43,104 | 11/1952 | Norway. |

GERALD M. FORLENZA, *Primary Examiner.*

R. B. JOHNSON, *Assistant Examiner.*

U.S. Cl. X.R.

198—138, 158

UNITED STATES PATENT OFFICE
CERTIFICATE OF CORRECTION

Patent No. 3,424,321 January 28, 1969

Robert D. Lichti

It is certified that error appears in the above identified patent and that said Letters Patent are hereby corrected as shown below:

Column 9, line 14, before "motion" insert -- swinging --.

Signed and sealed this 17th day of March 1970.

(SEAL)
Attest:

Edward M. Fletcher, Jr.
Attesting Officer

WILLIAM E. SCHUYLER, JR.
Commissioner of Patents